US006884454B2

(12) United States Patent
Pimentel

(10) Patent No.: US 6,884,454 B2
(45) Date of Patent: Apr. 26, 2005

(54) APPETITE SUPPRESSING DIET BAR

(76) Inventor: Julio Lionel Pimentel, 3206 Windgate Dr., Buford, GA (US) 30519-1941

( * ) Notice: Subject to any disclaimer, the term of this patent is extended or adjusted under 35 U.S.C. 154(b) by 135 days.

(21) Appl. No.: 10/274,543

(22) Filed: Oct. 21, 2002

(65) Prior Publication Data

US 2004/0076719 A1 Apr. 22, 2004

(51) Int. Cl.$^7$ .................................................. A23L 1/29
(52) U.S. Cl. ....................................... 426/634; 426/601
(58) Field of Search ........................... 426/634, 72, 74, 426/601

(56) References Cited

U.S. PATENT DOCUMENTS 4,423,072 A * 12/1983 Stahly ........................ 514/552
2002/0119915 A1 * 8/2002 Portman ........................ 514/8

* cited by examiner

*Primary Examiner*—Helen Pratt

(57) ABSTRACT

A method to decrease feed intake in humans by ingesting a diet bar comprising of whole soybean and medium chain triglycerides and/or medium chain fatty acids, said bar containing an adequate level of nutrients to serve as a meal.

7 Claims, No Drawings

APPETITE SUPPRESSING DIET BAR

BACKGROUND OF THE INVENTION

1. Field of the Invention

The present invention relates to a diet bar having a satiety effect on humans when consumed prior to any meal. This diet bar is composed of whole soybean containing trypsin inhibitor that increase CCK levels, which suppress appetite; and medium chain fatty acids or medium chain triglycerides that increase the level of beta-hydroxy butyrate which also suppress food intake.

2. Discussion of the Background

There are not magic bullets for the reduction of body weight, all drugs, herbs and exercise programs work because we reduce our food intake or make us expend more energy that the one we have ingested. All these procedures kept your body weight down as long as you keep in the program. Almost 100% of all dieters come back to their pre-program weight within two years. The more effective way to reduce your body weight is by decreasing and maintaining a low food intake. Obesity has become a leading cause of preventable death, cardiovascular problems and diabetes been the major effects of obesity.

Medium-chain fatty acids (MCFA, 6–12 carbons) are naturally found in coconut oil, palm kernel oil, and milk. Medium-chain triglycerides (MCT) oil is comprised of primarily caprylic (C8:0) and capric (C10:0) acids with a very small percentage of caproic (C6:0) and lauric (C12:0) acids, which are esterified to a glycerol backbone. The most prevalent fatty acids found in food are oleic (C18:1), palmitic (C16:0), stearic (C18:0), and linoleic (C18:2). MCT oil is a light yellow, translucent, odorless liquid at room temperature. Although completely saturated, it is not atherogenic (Blackburn et al ,1989) or solid in consistency like other saturated fats. The energy value of MCT oil is approximately 7–9 calories per gram, and this fat is metabolized differently than long-chain triglycerides (LCT). Complete hydrolysis to MCFA's and small amounts of monoglycerides occurs in the stomach with very little secretion of pancreatic lipase or bile acids. After MCFA's are absorbed into the intestinal mucosal cells, they are not resynthesized into triglycerides and incorporated into chylomicrons as are long-chain fatty acids. MCFA's bypass the lymphatic system and are carried by the portal vein directly to the liver, where they are metabolized to produce carbon dioxide, ketones, and acetate. MCFA enter the mitochondria independently of the carnitine transport system and undergo preferential oxidation. They burn quickly and completely, producing huge amounts of energy (Bach and Babayan, 1982). Dietary fat and the fat stored on our body as adipose tissue are in the form of triglycerides, which contain long-chain fatty acids (14 carbons or more) (Babayan, 1987). Therefore MCT's will be not storage or accumulated in adipose tissues. MCT's reduce the breakdown of muscle tissue when dieting due to the production of ketone bodies that burn preferentially to muscle tissue for energy. MCT's improve the absorption of amino acids, which are critical for muscle tissue repair. They also improve calcium and magnesium, minerals needed for the metabolism of carbohydrates and amino acids (Kreb's cycle)and for improving muscle contraction response time and energy. They also decrease the absorption of cholesterol in the intestine.

Due to the unique properties of MCT's, they are used as a fat source in many diseases states. MCT oil can be used to add calories to a formula or diet in the case of malabsorption syndromes and people with intensive burns (Babayan, 1981), because it requires lower concentrations of bile or pancreatic lipase for digestion and absorption. MCT is often used in weight loss programs because it possesses thermogenic effects and suppresses appetite when taken before meals.

It has been observed that supplementation of newborn piglets with (MCT) decreased nitrogen excretion and breakdown of liver glycogen. These observations indicate newborn piglets utilize (MCT) as energy source rather than body reserves of glycogen and protein. Research work at Illinois has demonstrated that the emulsification of medium chain triglycerides further improves digestion and absorption. When MCT's are substituted for long-chain triglycerides in the diet, animals gain less weight, store less adipose, and experience an increase in metabolic rate (Hashim, S A, 1967; Baba, N et al, 1982 and Geliebter, A. et al, 1983). MCT-fed mice also have been shown to possess increased endurance over that of LCT-fed mice (Fushiki, T et al, 1995).

Rats fed 10% or 20% fat as MCT eat less than rats fed the same amount of food with LCFA (Furase et al, 1992). The intake of MCT produces beta-hydroxy butyrate, which suppress food intake (Furase et al, 1997). MCT's decreased food intake by a post-absorptive mechanism (Van Wymelbeke V., et al, 1998). In long term MCFA feeding in animals, weight accretion has been attenuated (Papamandjaris AA, et al, 1998). Infusion of MCT accelerates small-bowel transit time as compared to LCFA (long-chain fatty acids) or saline (Ledeboer M, et al. 1995). So the intake of MCT's prior to a meal will decrease meal size.

Soybean contains antinutritional factors which inhibit animal performance, heat-labile antinutritional protease inhibitors are found in virtually every legume. Protease inhibitors are proteins that combine with the enzymes associated with protein digestion such as trypsin and chymotrypsin, significantly inhibit their function. This inhibition, if not inactivated, is accompanied by moderate-to-severe depression in animal performance. Osborne and Mendel, in 1917, made the significant discovery that soybeans had to be heated in order to support the growth of rats. Soybean contains 61% polysaturates fatty acids, linoleic (c18-2) and linolenic.

The extraction of oil from soybean removes sterols and some saponins, which are thought to help protect against colon cancer. Extracting soy flour with ethanol to produce soy concentrate removes anticancer activity, presumably by extracting phytochemicals such as isoflavones (genestein), protease inhibitors and saponins. Soybean has isoflavones primarily genestein and daidzien and a minor called glycitein.

The ingestion of raw soybean increase CCK release in man and heat treatment reduces the trypsin inhibitor content of the flour (Calam et al, 1987). Two types of soybean protein inhibitors have been identified, the Kunitz inhibitor (KSTI) and the Bowman-Birk inhibitor (BBI) both KSTI and BBI are inactivated during moist heat treatment. Hypertrophy of the pancreas is one the primary physiological effects, accompanied by a stimulation of its secretory activity. Neither raw soy flour nor other soy product produced pancreatic enlargement in pigs or monkeys (Struthess and MacDonald, 1983). Feeding soybean extract containing the Bowman-Birk protease inhibitor or feeding the purified protease inhibitor decreased chemically induced colon cancer in rats and mice (Thiagarajan, D et al, 1998).

It has been observed that feed intake and size of meal was decreased for 6 hours after supplying trypsin inhibitors to zucker rats. (Peiken 1985, McLaughlin 1983). The effect of trypsin inhibitor is to increase the concentration of CCK secretion producing satiety and resulting in a consequent decrease in food intake and over time decrease in body weight. Feeding also heated or raw soybean flours had a significant inhibitory effect on lipase digestive enzyme activities in the pancreas and in its secretion (Khalifa, et al 1994).

In a study with fat pre-loads it was observed that a one dose emulsion of long chain triglycerides (32 ml with 16 gr. lipids) containing:

c16=8%, c18-0=4%, c20-0=2%, c18-1=56% and c18-2=23% (166 calories) evoked higher level of CCK than medium chain triglycerides (32 ml with 16 gr. lipids) containing: c6=1%, c8=81%, c10=16% and c12=2% (128 calories)(Isaacs, et al, 1987).

Suppression of appetite decreases caloric intake therefore a reduction of body weight, a combination of medium chain fatty acids, long chain fatty acids and protease inhibitors in a complete nutritious health bar suppress appetite enough to have a reduce feed intake.

SUMMARY OF THE INVENTION

A diet bar containing medium chain triglycerides, whole soybean that suppress appetite when ingested 15–120 minutes prior to a meal. The medium chain triglycerides produce beta-hydroxy-butyrate, which has a satiety effect. The long chain fatty acids and the presence of trypsin inhibitors in whole soybean increase the level of CCK which have a satiety effect. The combination of these products when taken prior to a meal reduces meal size or otherwise produces satiety strong enough to be able to skip a meal (meal replacer).

DESCRIPTION OF THE PREFERRED EMBODIMENTS

Obesity is the major health risk for the development of several diseases including cardiovascular problems, arthritis, high blood pressure and diabetes. In a recent report it has been found that 65% of the US population is overweight and that 10% are extremely obese. The major culprits of the increase in obesity are the high caloric intake and sedentary life, the role that genetic plays is minimal.

There are several treatments of obesity, they include surgical, appetite suppressant drugs, diets and exercise. Operation like stomach stapling is expensive and requires several hospitalization days. Liposuction takes out the fat but if the patient does not change his/her lifestyle, the fat will accumulate in another areas. Appetite suppressant drugs and herbal products have secondary side effects and there have been cases that people have died due to the side effects. Recently a prescription drug had to be pulled of the market because of cardio-vascular problems. Inhibition of fat absorption by lipase inhibitor have also side effects, it produce steatorrhea and malabsorption of fat-soluble vitamins.

A better solution for the obesity problem is to reduce appetite by natural means, let our body control our appetite. This invention disclose a method to suppress food intake by increasing CCK level (appetite suppressant hormone) and beta-hydroxy butyrate after a consumption of a healthy diet bar containing whole soybean and medium chain triglycerides.

It is an object of the present invention to provide a natural mean to decrease appetite in humans.

Other object of the present invention is that other compounds having trypsin inhibitor and beta-hydroxy butyrate, or purified trypsin inhibitor or purified beta-hydroxy butyrate can be utilized having the same results as the present invention.

Other object of the present invention is that it can be used as a way to decrease body weight due to decreased intake and the thermogenic effect of the medium chain fatty acids.

EXAMPLE 1

The diet bar comprises of whole soybean, soybean flour, medium chain triglycerides, vitamins, minerals, flavor coating and oats. The formulation can vary depending on the serving size and ingredients. The following examples show some formulations but they can vary without affecting the main objective of this invention.

| Ingredients | (gr.) | | | | | |
|---|---|---|---|---|---|---|
| Oats | 10 | 0 | 0 | 10 | 0 | 0 |
| Soybean Whole | 30 | 30 | 20 | 20 | 10 | 0 |
| Soy Flour | 0 | 0 | 10 | 10 | 20 | 30 |
| MCT-oil | 5 | 5 | 5 | 5 | 5 | 5 |
| Vitamin & Minerals | 1 | 1 | 1 | 1 | 1 | 1 |
| Flavor Coating | 4 | 4 | 4 | 4 | 4 | 4 |
| Total Serving (gr.) | 50 | 40 | 40 | 50 | 40 | 40 |
| Nutrients/Serving | | | | | | |
| Calories | 202 | 165 | 166 | 200 | 168 | 169 |
| Fat (gr.) | 11.6 | 11 | 11 | 11.7 | 11.3 | 11.2 |
| Protein (gr.) | 12.6 | 11.5 | 11.2 | 12.4 | 10.9 | 10.7 |
| Carbohydrates (gr.) | 15.8 | 9 | 9 | 15.6 | 8.7 | 8.6 |
| Trypsin Inhibitor (mg) | 1425 | 1425 | 1300 | 1300 | 1175 | 1050 |

The ingredients are first mixed, compressed to a bar form and finally coated with a flavor coating and package. The diet bar is to be use before meal as a intake suppressant or as meal replacement. This bar has the required ingredients to replace a meal.

It will be apparent for those skilled in the art that a number of modifications and variations may be made without departing from the scope of the present invention as set forth in the appending claims.

What I claim is:

1. A method for decreasing food intake in humans by orally consuming a nutritive bar comprising of whole or defatted soybean and medium chain triglycerides.

2. A method of claim 1, wherein said nutritive bar is consumed 15 to 120 minutes prior to any of the three major daily meals.

3. A method of claim 1, wherein whole or defatted soybean consist of 50% to 80% of said bar total weight.

4. A method of claim 1, wherein medium chain triglycerides consist of 5% to 25% of said bar total weight.

5. A method of claim 1, wherein the nutritive bar containing whole or defatted soybean and medium chain triglycerides is supplemented with other feed ingredients, vitamin, minerals and flavoring agents in order to formulate a nutrient-adequate and tasteful bar, said supplementation varies from 1% to 10% of said bar total weight.

6. A method of claim 1, wherein said decrease in feed intake is due to the appetite inhibition resulting from the increase in cholecystokinin (CCK) and beta-hydroxy butyrate.

7. A method of claim 6, wherein the increase in CCK and beta-hydroxy butyrate can also result from the consumption of ingredients other than soybean or medium chain triglycerides.

* * * * *